A. W. FORBES.
SUPPORTING MEANS FOR TRAVELING CABLES AND THE LIKE
APPLICATION FILED SEPT. 15, 1919.
1,355,460.
Patented Oct. 12, 1920.
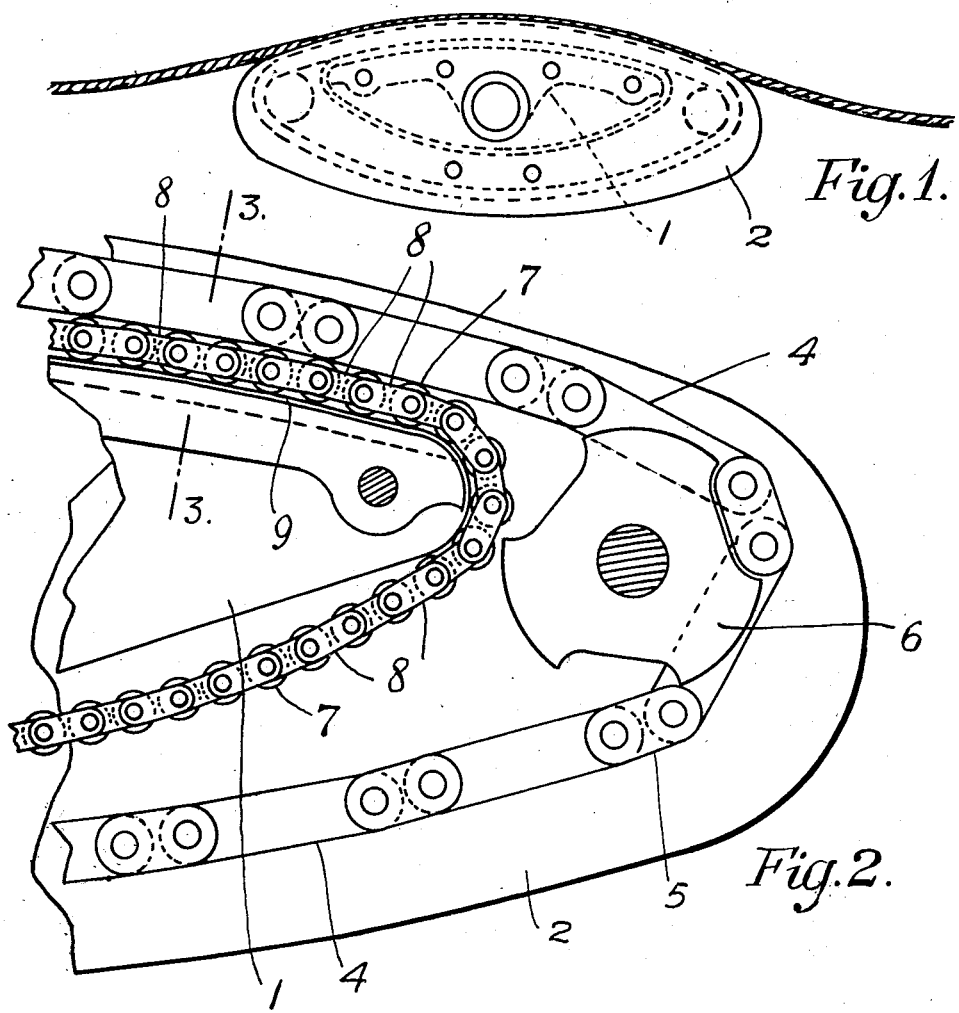
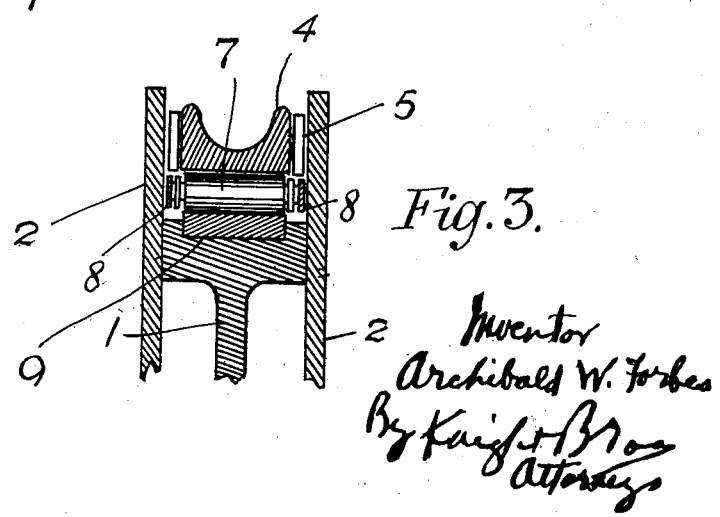
Inventor
Archibald W. Forbes
By Knight Bros
Attorneys

UNITED STATES PATENT OFFICE.

ARCHIBALD WALLACE FORBES, OF EDINBURGH, SCOTLAND.

SUPPORTING MEANS FOR TRAVELING CABLES AND THE LIKE.

1,355,460.     Specification of Letters Patent.     Patented Oct. 12, 1920.

Application filed September 15, 1919. Serial No. 324,006.

*To all whom it may concern:*

Be it known that I, ARCHIBALD WALLACE FORBES, a subject of the King of the United Kingdom of Great Britain and Ireland, and resident of No. 22 Starbank road, Trinity, Edinburgh, Scotland, engineer, have invented certain new and useful Improvements in Supporting Means for Traveling Cables and the like, of which the following is a specification.

This invention relates to supporting means for aerial traveling cables, haulage ropes and the like and it has for its object to provide a bearing surface specially adapted for guiding, carrying or deflecting heavy haulage ropes particularly for use with aerial ropeways having long stretches of heavy rope.

For such supporting means it is usual to employ bearing pulleys or wheels but for heavy work the necessary bearing surface cannot be obtained without using multiple pulley bearing devices or pulleys or wheels of a very great diameter.

In accordance with the present invention the bearing means consists of a quadrant, flat or slightly curved member mounted upon a suitable bearing shaft or pin, and located at each side of this quadrant or like member is an endless chain or the like having a groove for the cable.

Preferably in carrying out this invention the quadrant or curved member has a suitable bearing surface for the endless chain or like member with the groove for the reception of the cable and the arc of the bearing surface of the quadrant member may correspond to pulleys of any required diameter and the arc of the bearing surface may be varied to suit different classes of work. The lengths of the bearing surface may also be reduced or increased to any required extent.

The device is preferably provided with an endless traveling chain of roller bearings adapted to pass between the grooved chain and the curved bearing surface; and the grooved chain is preferably carried on suitable guide pulleys or the like.

In order that this invention may be clearly understood, I have hereunto appended an explanatory drawing showing one form of the device.

Figure 1 is a side view of one of the cable guides or supporting devices.

Fig. 2 is an enlarged view showing one end of the device with the side cheek removed.

Fig. 3 is a detail cross section on the line 3, 3 Fig. 2.

The device shown on the drawing has a quadrant or curved bearing piece 1 having a boss mounted upon a supporting cross shaft or pin and bolted on each side of the member 1 is a side cheek or plate 2. Mounted between the side cheeks 2 is an endless chain consisting of a series of grooved slides or links 4 connected to each other by means of side connecting links 5, and this chain 4, 5, is carried upon idle or guide pulleys 6, mounted between the side cheeks. Interposed between the slides or links 4 and the curved bearing surface of the member 1 is an endless traveling chain consisting of a series of bearing rollers 7, connected together by means of side links 8. The bearing surface of the member 1 may be fitted with a removable bearing face or strip 9 for engaging the rollers 7.

The grooves in the slide pieces 4, are shaped to accommodate the cable and both the groove and the roller chains are free to move with the cable (the latter chain moving at a lesser speed than the grooved chain and the cable) and the friction between the grooved chain and the curved bearing surface is taken up by the interposed rollers.

Claims.

1. A guide for traveling cables comprising a pivotally supported bearer, an endless chain encircling said bearer for engaging the cable and an anti-friction bearing between said bearer and chain.

2. A guide for traveling cables as specified in claim 1 comprising a bearer having a slightly curved bearing surface.

3. A guide for traveling cables as specified in claim 1 having an anti-friction roller bearing between the bearer and chain.

4. A guide for traveling cables comprising a pivotally supported bearer, an endless link chain encircling said bearer for engaging the cable and an endless roller chain between said bearer and link chain.

5. A guide for traveling cables comprising a pivotally supported bearer, a roller chain movable over said bearer, an endless link chain supported by and encircling said roller chain for engaging the cable, said link chain comprising grooved bars linked together and sprockets for guiding said link chain.

6. A guide for traveling cables as specified in claim 1 wherein the anti-friction bearing is adapted to travel with the chain and cable.

A. W. FORBES.

Witnesses:
ROBERT H. LYLE,
ALEX. TURNBULL.